United States Patent
Cseh et al.

(10) Patent No.: US 8,188,657 B2
(45) Date of Patent: May 29, 2012

(54) ILLUMINATING LAMP AND METHOD OF MAKING SAME

(75) Inventors: Geza Zoltan Cseh, Budapest (HU); Ferenc Fazekas, Piliscsaba (HU); Peter Lajos Nagy, Budapest (HU)

(73) Assignee: General Electric Company, Schenectady, NY (US)

( * ) Notice: Subject to any disclaimer, the term of this patent is extended or adjusted under 35 U.S.C. 154(b) by 228 days.

(21) Appl. No.: 12/642,995

(22) Filed: Dec. 21, 2009

(65) Prior Publication Data

US 2011/0148269 A1    Jun. 23, 2011

(51) Int. Cl.
*H01J 17/16* (2006.01)
*H01J 9/00* (2006.01)

(52) U.S. Cl. ............. 313/570; 313/634; 445/39; 445/58

(58) Field of Classification Search .................. 313/570, 313/634, 631, 331; 445/39, 44, 58, 26
See application file for complete search history.

(56) References Cited

FOREIGN PATENT DOCUMENTS

| FR | 665295 A | 9/1927 |
|---|---|---|
| GB | 2294806 A | 5/1996 |
| JP | 48084376 U | 10/1973 |

OTHER PUBLICATIONS

EP Search Report issued in connection with corresponding EP Patent Application No. 10194270.4 filed on Dec. 10, 2010.

*Primary Examiner* — Joseph L Williams
(74) *Attorney, Agent, or Firm* — Fay Sharpe LLP

(57) ABSTRACT

A technique for mounting single or double ended quartz halogen or HID burner on threaded incandescent lamp base facilitating high volume production and use of existing manufacturing equipment. The pinched end portion of the burner is received in a slot formed in an end of a ceramic tubelet and secured therein and supported thereon by cementing or elastic adhesive bond material. The tubelet has its opposite end secured over a reduced diameter portion of a stem extending from the incandescent lamp base. An outer bulb of translucent or transparent material is received over the base-burner sub-assembly and the bulb secured to the base.

16 Claims, 8 Drawing Sheets

US 8,188,657 B2

ILLUMINATING LAMP AND METHOD OF MAKING SAME

BACKGROUND OF THE DISCLOSURE

In an effort to reduce electrical power consumption, it has become desirable to replace incandescent lamps with more efficient lamps such as high efficiency line voltage quarts halogen burner lamps and high intensity arc discharge (HID) burner lamps. However, such lamps have heretofore required special mountings, particularly for double-ended burners, i.e., burners with electrodes extending from opposite ends thereof. Single ended quartz halogen and HID burners also require special mounting and provision for attachment to the burner electrodes.

In view of the widespread usage and large numbers of threaded socket fixtures for incandescent lamps in use, it has been desired to adapt the lamp burners for mounting in a conventional threaded base of the type employed for incandescent lamp bulbs in order to enable usage of quartz halogen and HID lamps in fixtures for incandescent lamps. It has further been desired to utilize for such lamps the highly automated manufacturing facilities currently in operation for manufacturing the threaded base and assembly of incandescent lamp bulbs.

Thus, it has been desired to provide for high volume manufacture quartz halogen and HID lamps and to provide for mounting same on an incandescent lamp base for providing a lamp which may be threaded into an existing socket on an incandescent lamp fixture and to provide a design for such lamps which enables manufacturing with existing equipment utilized for incandescent lamps.

Heretofore, the manufacture of quartz halogen and HID lamps has required mounting the burners with thick lead wires which necessitated considerable manual work and which was difficult to automate. The mounting of such burners in an outer bulb has heretofore been accomplished by such techniques as applying metal clips and providing additional lead wires in the stem and coil lead wires. These mounting techniques also required substantial amounts of manual work and did not readily lend themselves to the use of fully automated mounting machines. Furthermore, the use of metal clips resulted in complex assembly operations and increased manufacturing cost.

FIG. 10 shows an existing quartz halogen lamp burner indicated generally at 1 attached to a stem indicated generally at 2 inserted in a threaded incandescent lamp base 3 with an outer transparent covered bulb 4.

FIG. 11 shows an existing mercury HID lamp burner 5 with initiating electrode 6 fed through a dropping resistor 7, connected to stem 8 and threaded base 9 with outer bulb B which may be translucent or transparent. Bulb B is typically filled with nitrogen.

FIG. 12 is a view of an existing metal halide plus mercury lamp burner 5' with electrodes 6', 6" fed through dropping resistor 7' and mounted on stem 8' of threaded base 9' and covered with a bulb B'. The bulb B' is typically filled with nitrogen.

SUMMARY OF THE DISCLOSURE

The present disclosure describes a quartz halogen or HID lamp of either a single end configuration wherein the electrodes extend outwardly of one end or a double end burner configuration in which electrodes extends from each opposite end of the burner and the technique of attaching or mounting either type of burner to the stem of an existing threaded base of the type employed in an incandescent lamp. The arrangement of the present disclosure permits the quartz halogen or HID burner to be attached or mounted on a ceramic member and secured to the ceramic member by cementing thereto and disposing the ceramic member over the stem extending from the incandescent lamp base for attachment thereto. The stem is attached to the threaded base by conventional means. An outer bulb may then be received over the assembly of the quartz halogen or HID burner and base and secured to the incandescent lamp base in a manner which may give the appearance of an incandescent light bulb.

DETAILED DESCRIPTION OF THE PREFERRED EMBODIMENTS

Figure 1:
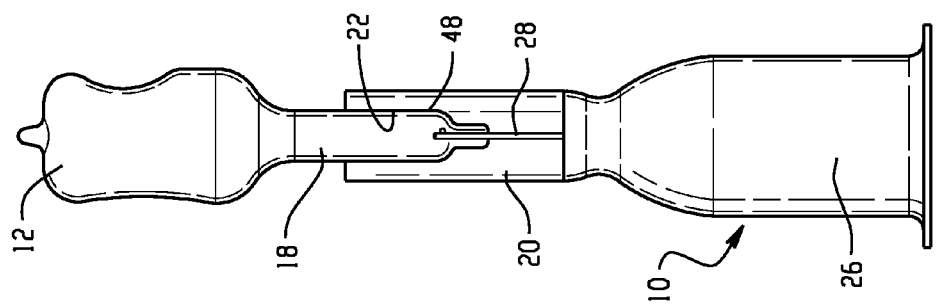
FIG. 1 is a right side elevation view of a single ended quartz halogen burner mounted to a stem for an incandescent lamp base utilizing a ceramic member.
Figure 2:
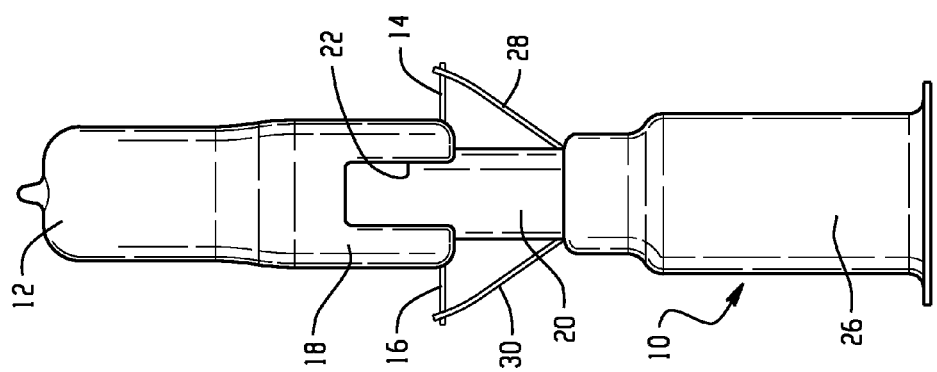
FIG. 2 is a left side view of the assembly of FIG. 1.
Figure 3:
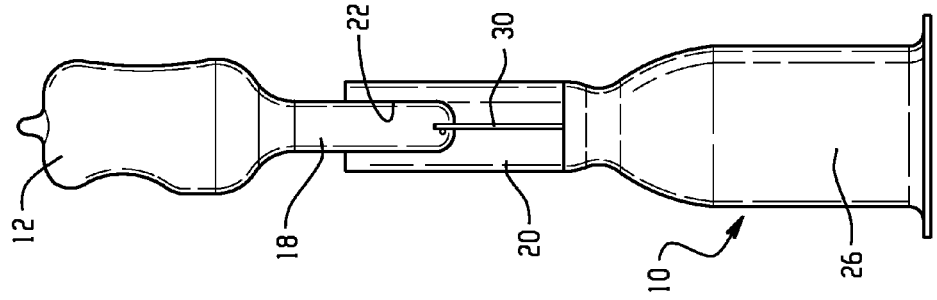
FIG. 3 is a view of the back side of the assembly of FIG. 1.
Figure 4:
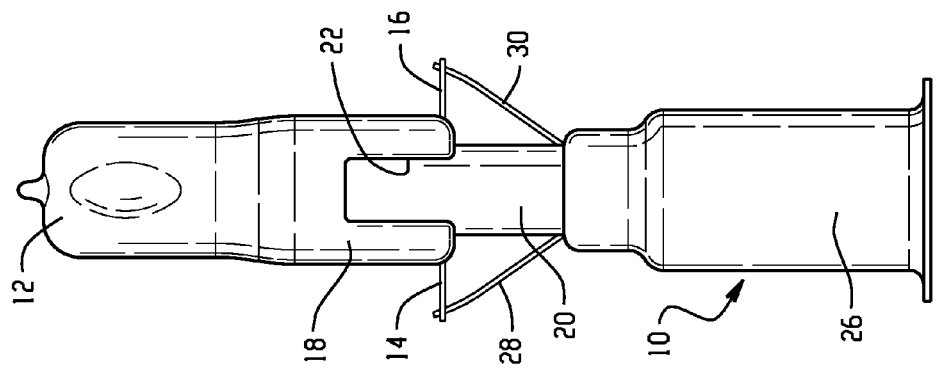
FIG. 4 is a left side view of the assembly of FIG. 1.

Referring to FIGS. 1-4, a sub-assembly of a quartz halogen burner is indicated generally at 10 and includes a single ended quartz halogen burner 12 oriented vertically having a pair of electrodes 14, 16 extending from opposites sides thereof in a generally horizontal direction. The lower portion of the burner 12 is formed in a pinched or flattened blade-type configuration as denoted by reference numeral 18 to facilitate mounting of the burner 12.

A ceramic member 20 having a generally tubular configuration has a slot 22 formed therein into which is received the blade portion 18 of the burner 12. The ceramic member 20 may have a generally cylindrical configuration or other cross-section such as elliptical or polygonal. In the present practice, it has been found satisfactory to secure the blade portion 18 in the slot 22 by cementing or by the use of elastic heat resistant adhesive, such as, for example, silicon based heat resistant glue such as Loctite® 5088 or other similar material. Where a cementitious material is employed for bonding the blade to the ceramic member, it has been found satisfactory to employ Sauereisen 31 material available from Sauereisen, 160 Gamma Drive, Pittsburgh, Pa. 15238-2989.

Figure 7C:
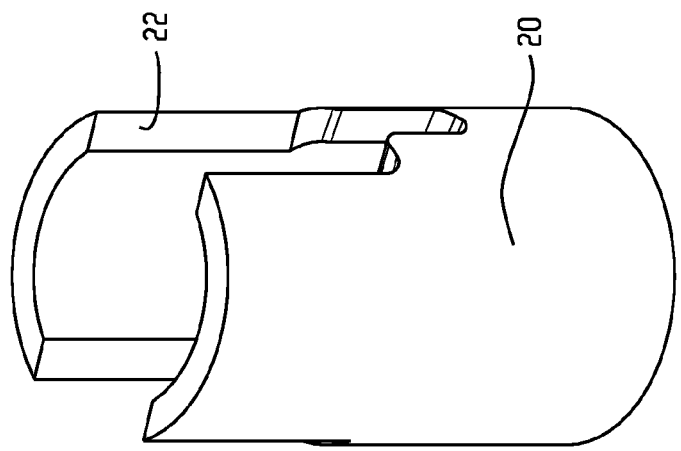
FIGS. 7a, 7b and 7c are pictorial view of the ceramic member employed for mounting the halogen burner of FIGS. 1 and 5.
Figure 7B:
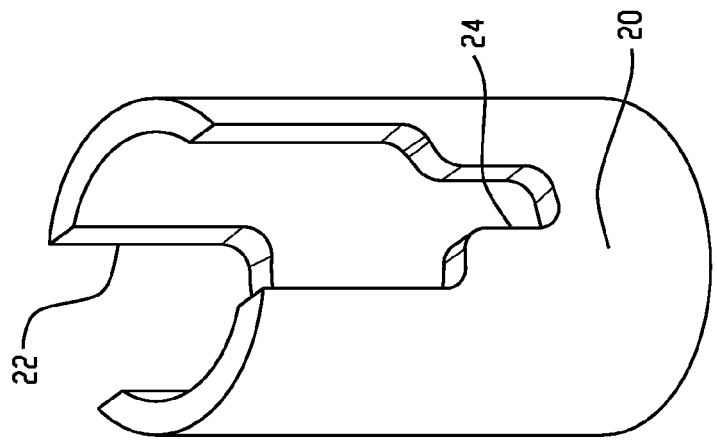
Figure 7A:
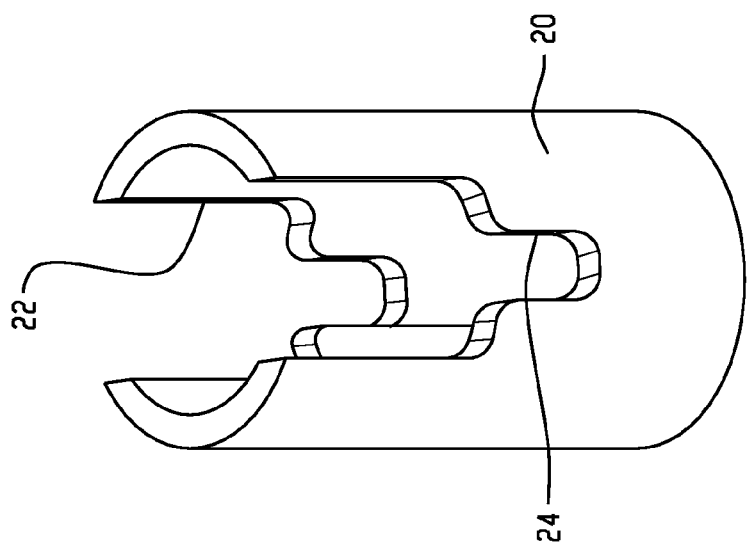

Referring to FIGS. 7a-7c, the tubular ceramic member 20 is shown as having the slot 22 formed therein with a narrower sub-slot 24 formed in the lower closed end of slot 22 for permitting the electrodes 14, 16 to pass therethrough when the blade 18 is received in the slot 22. The assemblage of the burner 12 and ceramic member 20 is then secured over the upper portion of a stem 26, which is of the type adapted for being received in the base of a conventional incandescent lamp such as, for example, that denoted by reference numeral 62 in FIG. 8. The ceramic member 20 may then be bonded or attached to the upper portion of stem 26 in the same manner as blade 18 was secured to the member 20; and, the same type of cementitious material or elastic heat resistant adhesive may be employed.

In the present practice, it has been found satisfactory to form the tubular ceramic member having an inner diameter greater than that of the upper portion of stem 26 by an amount in the range of about 0.1 to 0.5 mm. However, where other cementitious material or elastic adhesive is employed, this difference may be extended as required to effect proper bonding. It has also been found satisfactory to form the tubular ceramic member with a wall thickness greater of at least about 0.5 mm in the radial direction to provide adequate support for the burner. In the present practice, ceramic member 20 preferably has a tubular configuration, but alternatively may be a solid member with recesses foamed in opposite sides or ends for receiving and attaching the burner pinch and base stem.

Referring to FIGS. 1-4, the electrodes 14, 16 have lead wires 28, 30 extending from the stem 26 attached respectively thereto by any convenient expedient as, for example, weldment. It will be understood that the leads 28, 30 extend downwardly through the stem and are attached to the base of the lamp in a manner well known in the art.

Figure 5:
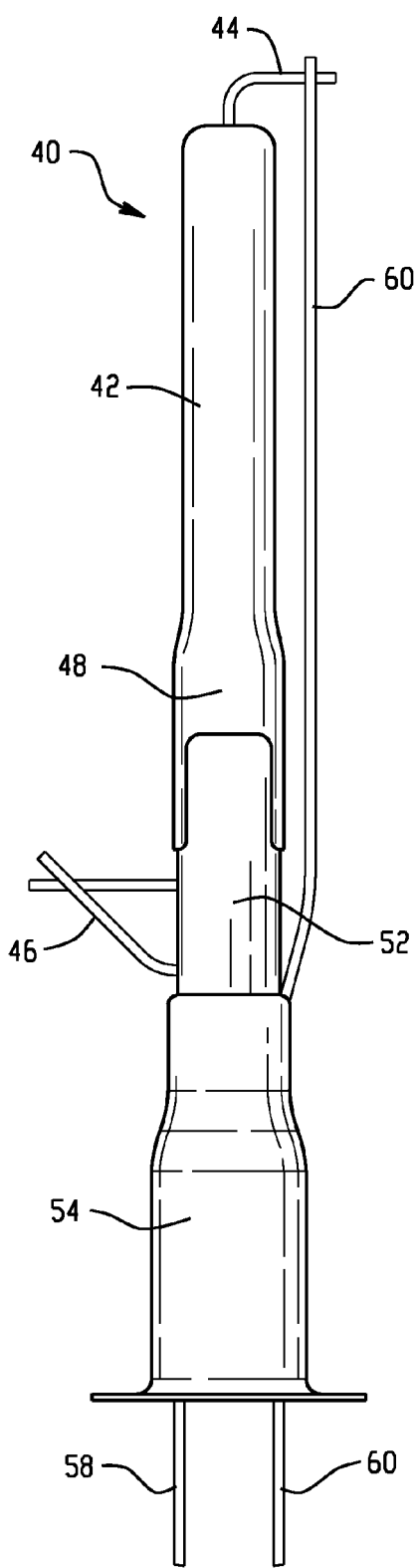
FIG. 5 is a view similar to FIG. 1 of a double ended quartz halogen burner mounted on the stem of an incandescent lamp base.
Figure 6:
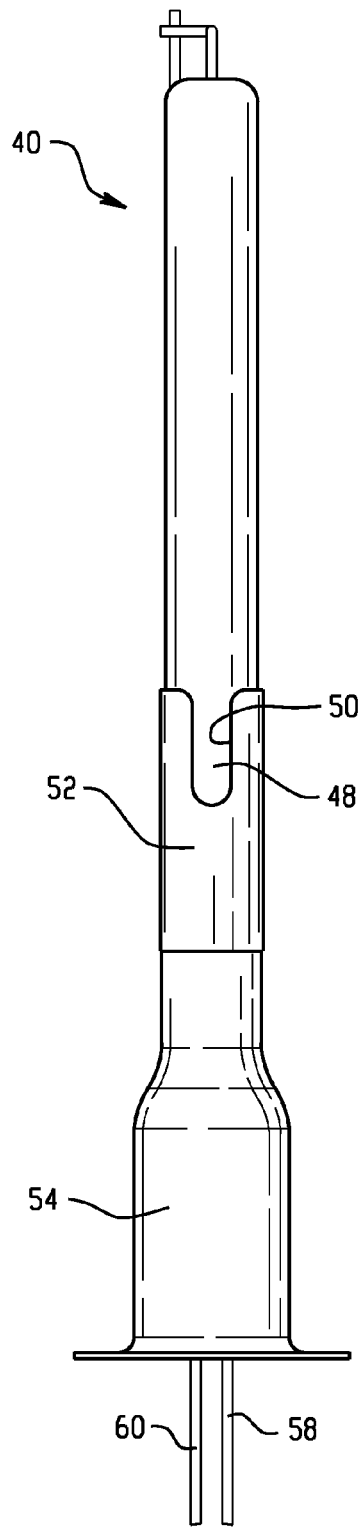
FIG. 6 is right side view of the assembly of FIG. 5.

Referring to FIGS. 5 and 6, another version of the lamp of the present disclosure is indicated generally at 40 and which comprises a sub-assembly of a double ended quartz halogen burner 42 with an electrode 44 extending from the upper end thereof and with an electrode 36 extending from the opposite or lower end thereof. The burner 42 has a pinched or flattened blade like mounting portion on one end thereof opposite electrode 44, which blade portion is denoted by reference numeral 48 in FIGS. 5 and 6. The blade portion 48 of the double ended burner 42 is received in a slot 50 provided in a generally tubular ceramic member 52 and secured therein with cementitious material or elastic heat resistant adhesive in the manner similar to the version shown in FIGS. 1-4. The ceramic member 52 is secured over the upper end of a stem 54 and secured thereon by similar techniques as employed for securing blade 48 in the slot 50. The leads 58, 60 extend upwardly through stem 54 and extend outwardly through the stem. Lead 58 is secured to electrode 46; and, lead 60 extends upwardly along the side of the burner 42 and is secured to the upper electrode 44. The leads 58, 60 may be secured to the electrodes 44, 46 by any suitable expedient, as for example, weldment.

Figure 8:
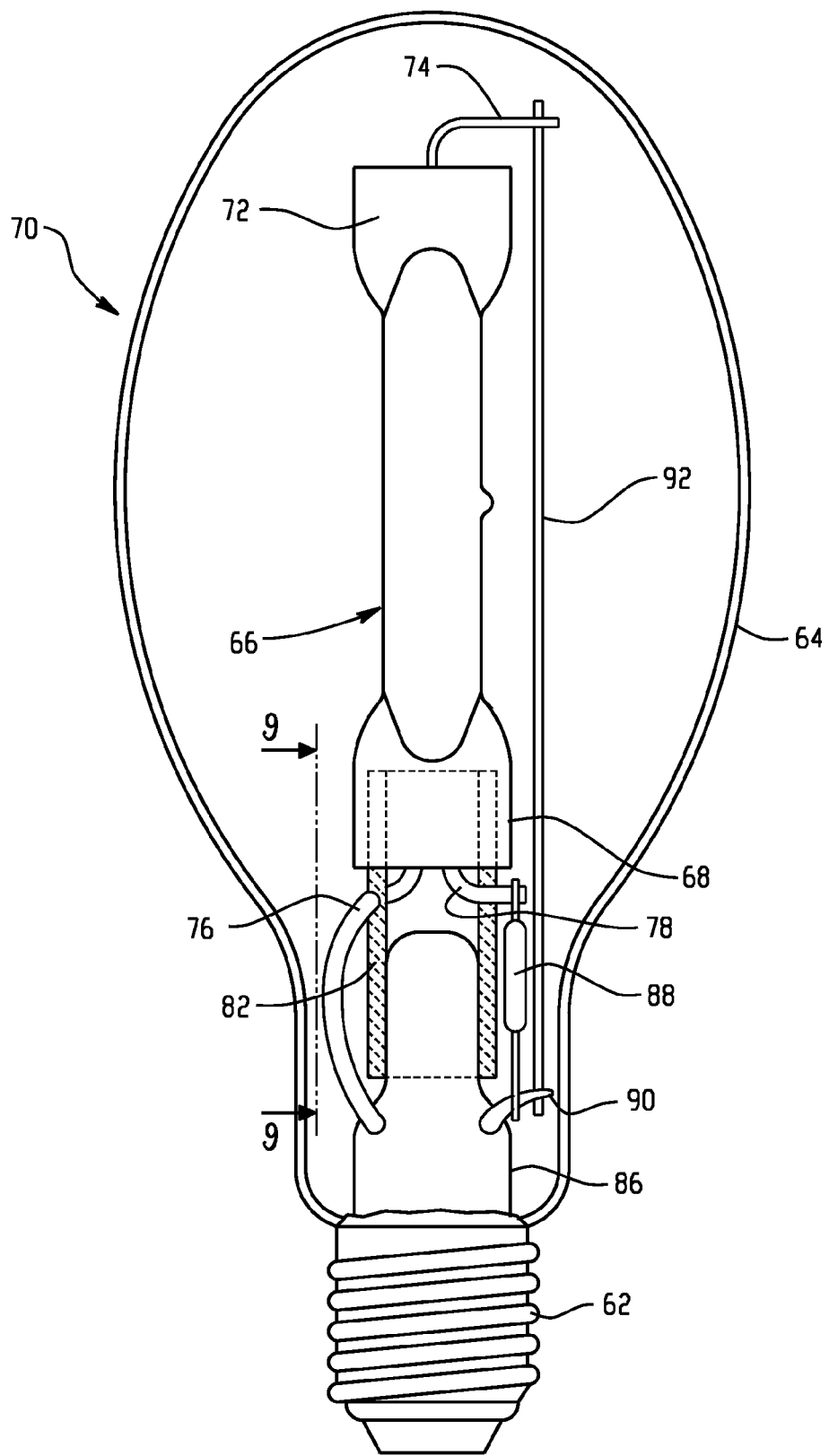
FIG. 8 is a sectional view of a mercury-free HID burner and base lamp assembly with outer bulb in accordance with the present disclosure.

The sub-assembly 40 of FIGS. 5 and 6 may then be assembled into a threaded incandescent bulb base such as, for example, base 62 illustrated in FIG. 8.

It will be understood that the assemblies 10, 40, when assembled into a base such as base 62, are then covered with a suitable translucent or transparent bulb such as bulb 64 having the configuration shown in FIG. 8 or as having any other desired shape or configuration. It will be understood that the bulb is secured to the base, such as base 62, by techniques well known in the art.

Figure 9:
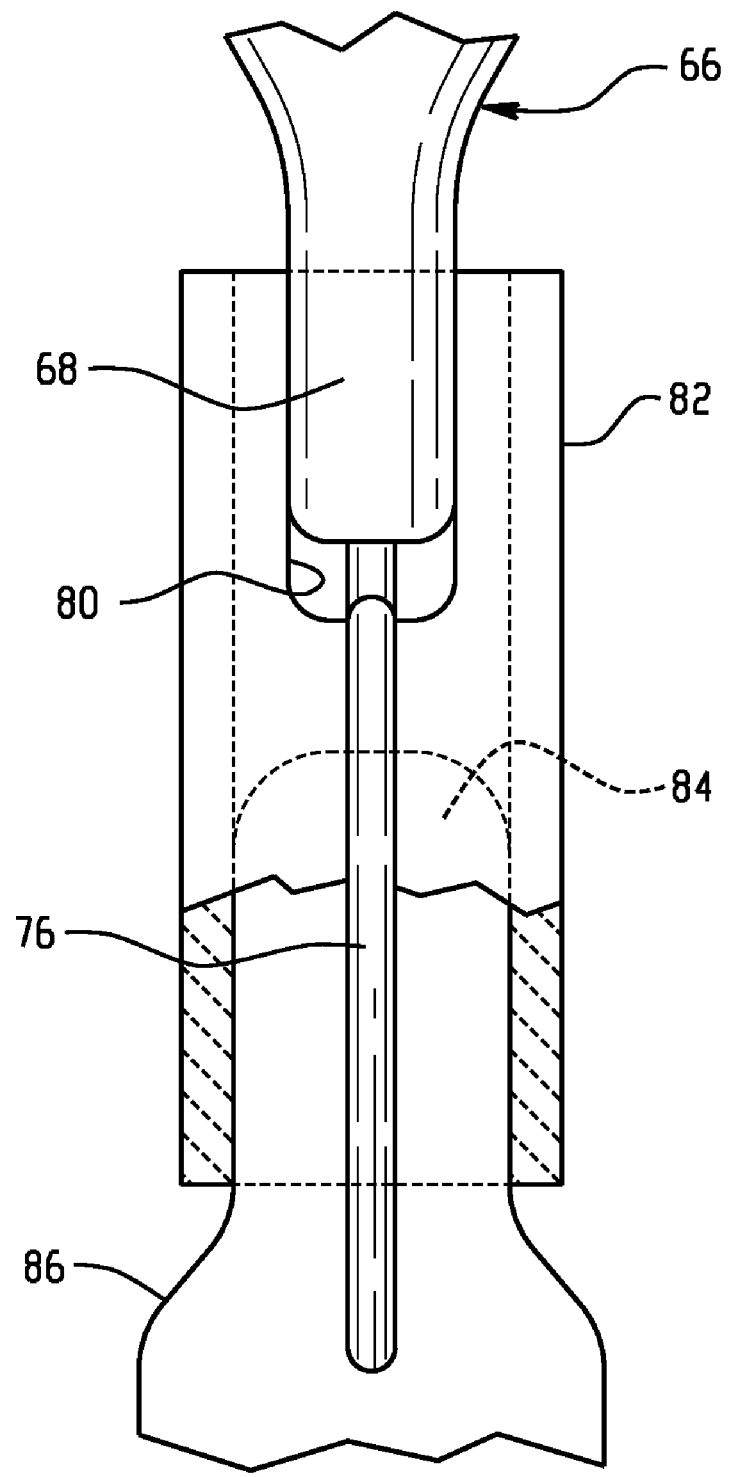
FIG. 9 is a sectional view taken along section indicating lines 9-9 of FIG. 8.
Figure 10:
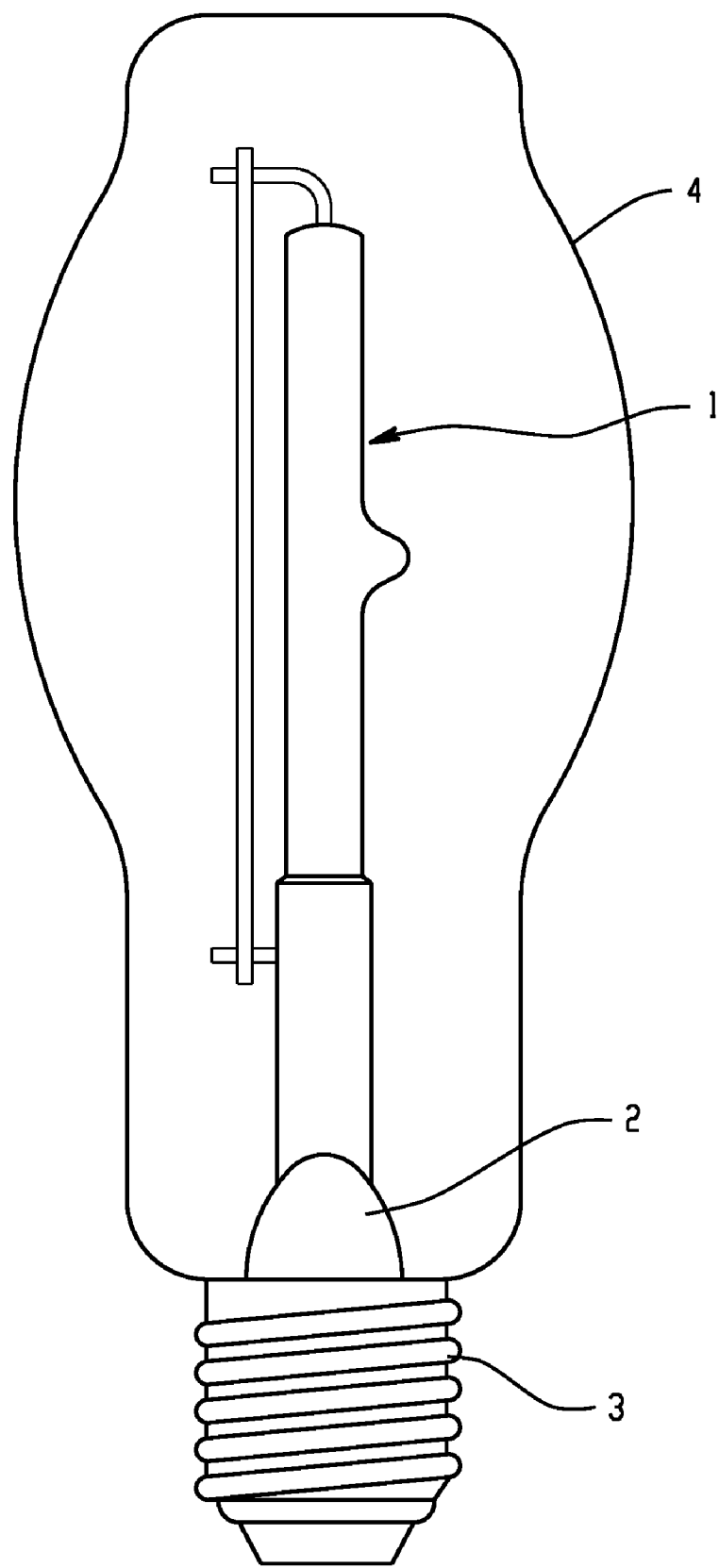
FIG. 10 is a pictorial view of an existing quartz halogen lamp burner mounted in a threaded incandescent base with a cover bulb.

Referring to FIGS. 8 and 9, a complete lamp assembly in accordance with the present disclosure is illustrated for a Mercury-free DEQ HID indicated generally at 70 and has a burner assembly indicated generally at 66. The burner assembly 66 has opposite ends thereof pinched or formed to a flattened blade-like configuration as denoted respectively by reference numerals 68, 72. Pinched end 68 has electrodes 74, 76 and 78 extending therefrom; and, pinched end 72 has an electrode 74 extending therefrom. The pinched end 68 of the burner 66 is received in a slot 80 honed in one end of a ceramic tubelet 82 having a hollow tubular configuration. It would be understood that the end 68 of the burner 66 is secured in the slot 80 by suitable adhesive or cementitious material as previously described. In the event that a burner is employed having three or four electrodes extending from one end, the tubelet 82 may have a second slot or opening formed therein, rotated 90° from slot 80, to permit passage of the additional electrode(s).

Figure 11:
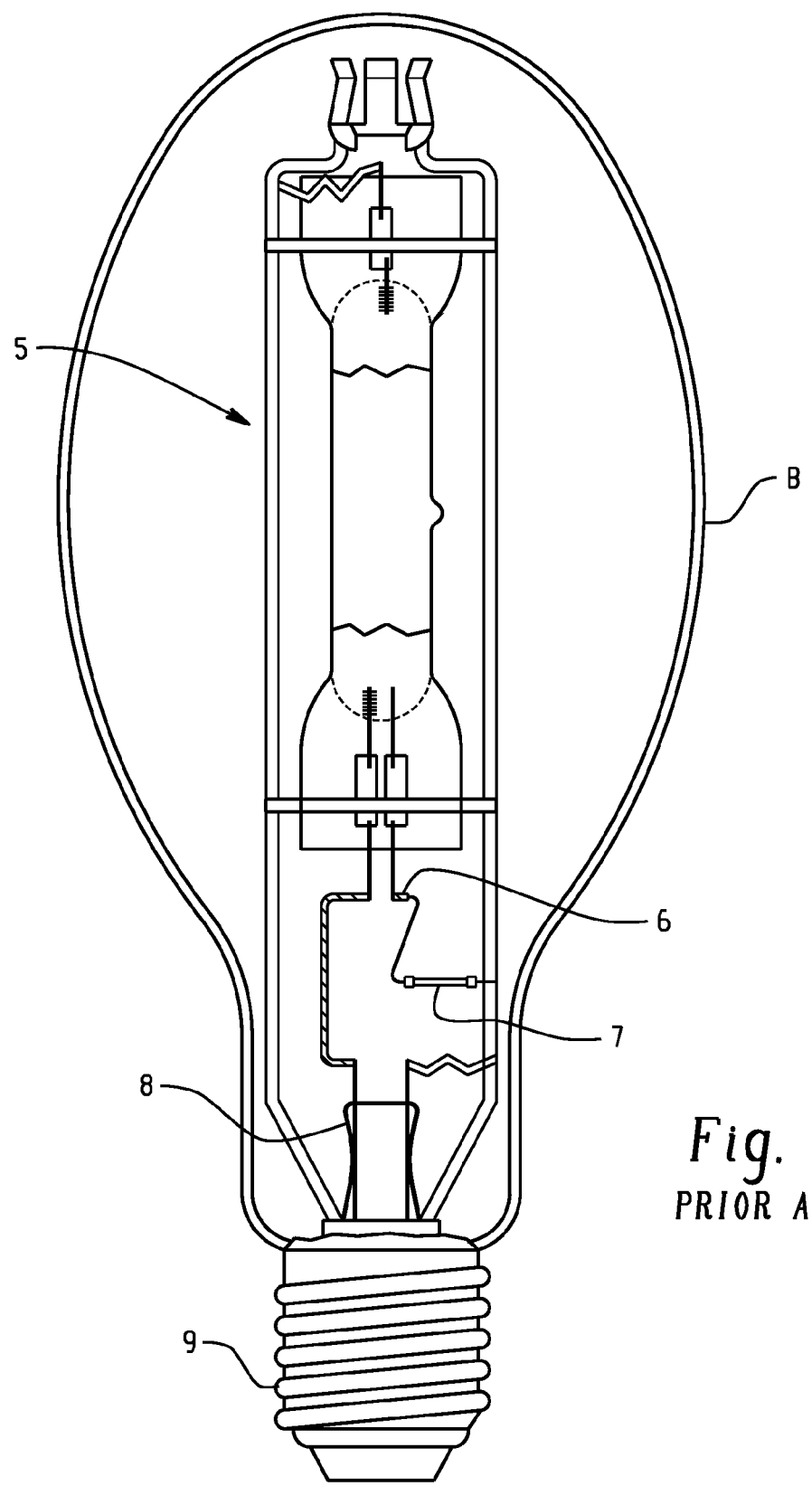
FIG. 11 is a sectional view of an existing mercury DEQ HID lamp assembly; and, FIG. 12 is a sectional view of an existing quartz halide mercury lamp assembly.
Figure 12:
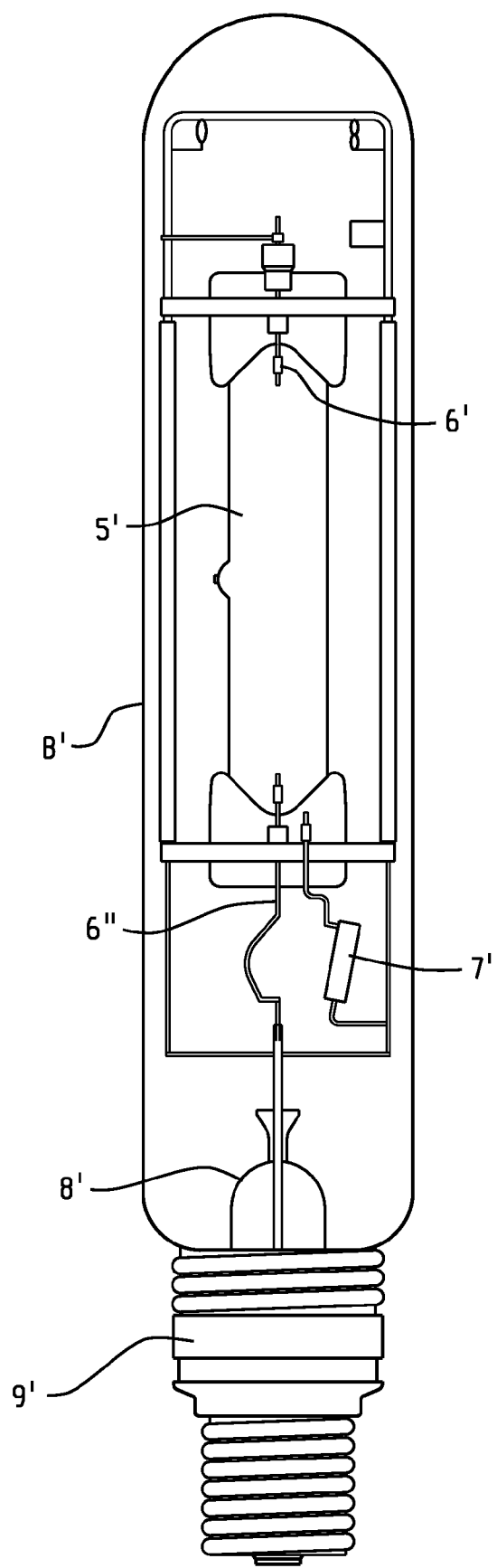

The lower end of the tubelet 82 is received over the reduced diameter upper end portion 84 of a stem 86 formed of electrically non-conductive material which is attached to the threaded lamp base 62. The electrode 76 extends directly into the stem 86 in a manner well known in the art; and, electrode 78 is connected through dropping resistor 88 which is connected to second electrode 90 which also extends into the stem 86. Electrode 90 is also connected to a filament or wire 92 which extends upwardly and is connected to the upper electrode 74 of the burner 66. The assembly 70 includes an outer bulb of translucent or transparent material denoted by reference numeral 64 which is attached to base 62 in a manner well known in the art. The lamp arrangement of FIGS. 8 and 9 thus eliminates the need for a support wire frame as employed in the existing lamps of FIG. 11 or FIG. 12.

The assembly 70 of FIGS. 8 and 9 thus provide a relatively simple and low cost way of mounting a mercury-free HID lamp burner on an existing threaded incandescent lamp base in a manner which reduces the amount of manual assembly required and facilitates high volume production and utilization of existing manufacturing equipment.

The present disclosure describes a quartz halogen lamp of either single ended or double ended configuration and a technique for attaching same to a stem mounted to a threaded incandescent lamp base in a manner which facilitates high volume production and the use of existing automated machinery for manufacturing incandescent lamps. The quartz halogen burner has a blade portion on one end thereof which is received in a slot formed in a tubular ceramic member and the blade is secured in the slot by cementitious or elastic adhesive material capable of withstanding the high temperatures encountered in service. The opposite end of the ceramic member is similarly secured over the upper end of the stem extending from the incandescent lamp base. The slot has a sub-slot in the closed end thereof permitting the electrodes from the burner blade to extend outwardly therethrough for attachment by weldment to the electrical leads from the stem. The sub-assembly thus formed may then be mounted in a standard threaded incandescent lamp base.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A method of mounting one of a quartz halogen and an HID lamp burner to an incandescent lamp base comprising:
   (a) providing one of (i) a single-ended and (ii) a double-ended burner having a pinched blade like mounting portion formed on an end thereof and having a pair of electrodes;
   (b) providing an incandescent lamp base having a stem and a pair of leads extending therefrom;

(c) forming a tubular member formed of ceramic material and forming a slot extending transversely with respect to the longitudinal axis of the base in an end thereof;

(d) disposing the burner mounting portion in the slot and securing the mounting portion in the slot;

(e) disposing the tubular member of ceramic material over the stem and securing the member thereon; and, (f) connecting an electrode from the burner to each one of the pair of stem leads and forming a sub-assembly.

2. The method defined in claim 1, wherein the step of securing the mounting portion in the slot includes adhesively bonding.

3. The method defined in claim 1, wherein the step of attaching an electrode includes weldment.

4. The method defined in claim 1, further comprising forming a notch at the end of the slot in the tubular member for receiving the electrodes therethrough.

5. The method defined in claim 4 wherein the step of forming a tubular member includes forming a member having an inner diameter greater than that of the stem by an amount of about 0.1-0.5 mm.

6. The method defined in claim 1, wherein the step of forming a tubular member includes forming a member having a wall thickness greater than about 0.5 mm.

7. The method defined in claim 1, wherein the step of securing the burner mounting portion includes securing with cementitious material.

8. A lamp comprising:

(a) a burner of one of the quartz halogen and an HID type having one of (i) a pair of electrodes extending from a mounting portion on an end thereof and (ii) an electrode extending from a mounting portion formed on each of opposite ends thereof;

(b) a tubular member formed of ceramic material having a transversely extending slot in an end thereof with a pinched blade like mounting portion of the burner received in the slot and secured therein; and, (c) an incandescent type lamp base having a stem and a pair of leads extending therefrom, wherein the tubular ceramic member has an end opposite the slot received over the stem and secured thereon forming a burner-base sub-assembly.

9. The lamp defined in claim 8, further comprising a bulb formed of one of (i) transparent and (ii) translucent material received over the burner and stem and attached to the base.

10. The lamp defined in claim 8, wherein the burner mounting portion is secured in the slot by one of (i) adhesive material and (ii) cementitious material.

11. The lamp defined in claim 8, wherein the tubular ceramic member is secured to the stem by cementitious material.

12. The lamp defined in claim 8, wherein the slot has a notch formed in an end thereof for allowing the electrodes to pass outwardly therethrough.

13. The lamp defined in claim 8, wherein the electrodes are attached to the leads by weldment.

14. The lamp defined in claim 8, wherein the tubular member is formed with an inner diameter greater than that of the stem by about 0.1-0.5 mm.

15. A method of mounting one of a quartz halogen and HID lamp burner to an incandescent lamp base comprising:

providing one of (i) a single-ended and (ii) double-ended burner having a mounting portion formed on an end thereof and having a pair of electrodes;

providing an incandescent lamp base having a stem and a pair of leads extending therefrom;

forming a ceramic member having first mounting surfaces formed on one side thereof;

disposing the burner mounting portion on the first mounting surfaces and securing the mounting portion thereon;

forming second mounting surfaces on a side of the ceramic member opposite the one side and disposing the second mounting surfaces on the stem and securing the member to the stem; and, connecting an electrode from the burner to each one of the pair of leads form the stem and forming a burner-base assembly.

16. A method of mounting one of a quartz halogen and an HID lamp burner to an incandescent lamp base comprising:

(a) providing one of (i) a single-ended and (ii) a double-ended burner having a mounting portion formed on an end thereof and having a pair of electrodes;

(b) providing an incandescent lamp base having a stem and a pair of leads extending therefrom;

(c) forming a tubular ceramic member having a slot formed in an end thereof;

(d) disposing the burner mounting portion in the slot and securing the mounting portion in the slot;

(e) disposing the tubular ceramic member over the stem and securing the member thereon;

(f) connecting an electrode from the burner to each one of the pair of stem leads and forming a sub-assembly; and, (g) disposing a bulb formed of one of (i) translucent and (ii) transparent material over the burner and stem and attaching the bulb to the base.

\* \* \* \* \*